(12) United States Patent
Peters et al.

(10) Patent No.: US 6,636,927 B1
(45) Date of Patent: Oct. 21, 2003

(54) BRIDGE DEVICE FOR TRANSFERRING DATA USING MASTER-SPECIFIC PREFETCH SIZES

(75) Inventors: Michael J. Peters, Fort Collins, CO (US); Donald N. Allingham, Fort Collins, CO (US); Patrick R. Bashford, Fort Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/405,345

(22) Filed: Sep. 24, 1999

(51) Int. Cl.[7] .......................... G06F 13/36; G06F 13/00; G06F 13/14
(52) U.S. Cl. ...................... 710/309; 710/306; 710/300; 710/100; 710/305; 710/313; 710/314
(58) Field of Search ................. 710/300, 100, 710/305, 306, 309, 313, 314

(56) References Cited

U.S. PATENT DOCUMENTS

| | | | |
|---|---|---|---|
| 5,367,695 A | * 11/1994 | Narad et al. ................. | 710/305 |
| 5,838,932 A | 11/1998 | Alzien | |
| 5,905,877 A | 5/1999 | Guthrie et al. | |
| 5,918,026 A | 6/1999 | Melo et al. | |
| 5,933,610 A | 8/1999 | Chambers et al. | |
| 5,978,879 A | * 11/1999 | Harumoto et al. .......... | 710/305 |
| 6,141,715 A | * 10/2000 | Porterfield ................... | 713/113 |

* cited by examiner

*Primary Examiner*—Tim Vo
(74) *Attorney, Agent, or Firm*—Martine & Penilla, LLP

(57) ABSTRACT

The present invention provides bridge device for transferring data using master-specific prefetch sizes. The bridge device is coupled between a first bus and a second bus with the master devices being coupled to the first bus and the slave devices being coupled to the second bus. The bridge device includes a set of prefetch control registers, a prefetch buffer, and bridge control circuitry. The set of prefetch control registers is arranged to store prefetch sizes of data to be prefetched for a set of the master devices with one prefetch control register being provided for a master device. The prefetch buffer is arranged to store data for transfer. The bridge control circuitry is coupled to the prefetch control registers and the prefetch buffer for transferring data between a source device and a destination device. The bridge control circuitry is further arranged to receive a first data transfer request from a selected master device for transferring data between the selected master device and a selected slave device. The bridge control circuitry issues a second data transfer request to the selected slave device for transferring the data. The bridge control circuitry receives the requested data from the source device and stores the received data in the prefetch buffer. The bridge control circuitry transfers the stored data from the prefetch buffer to the destination device when the prefetch buffer receives and stores data size that correspond to the prefetch size stored in a prefetch control register associated with the selected master device.

32 Claims, 6 Drawing Sheets

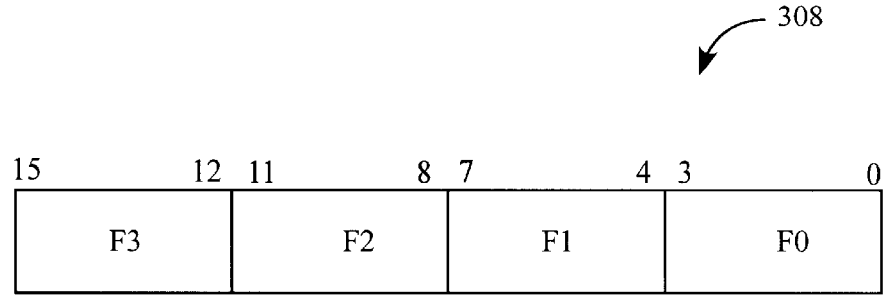
FIG. 6
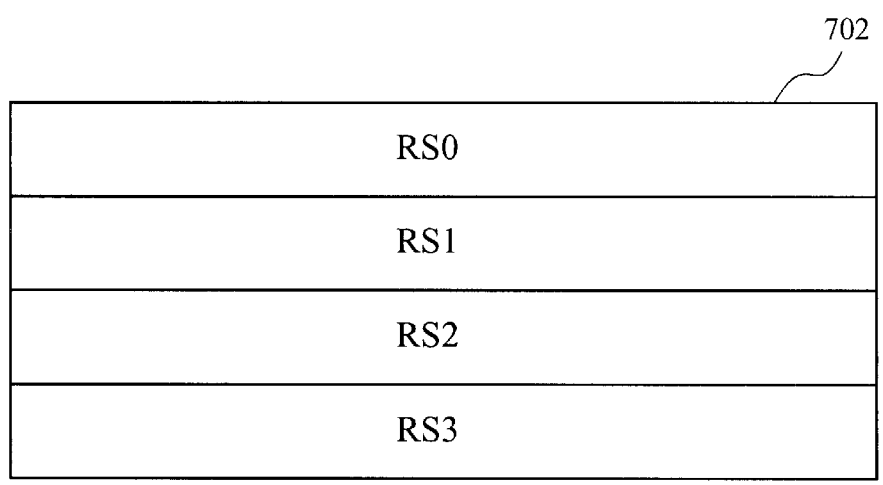
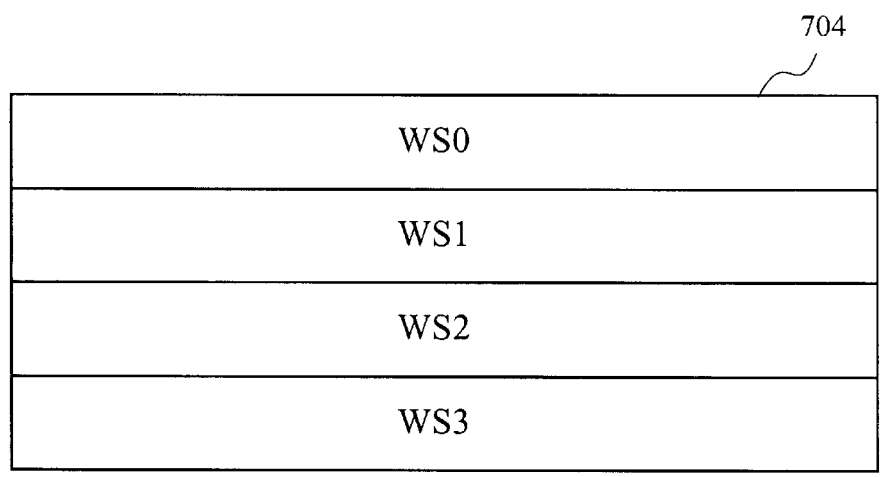
FIG. 7

BRIDGE DEVICE FOR TRANSFERRING DATA USING MASTER-SPECIFIC PREFETCH SIZES

BACKGROUND OF THE INVENTION

1. Field of the Invention

This invention relates generally to bridge devices, and more particularly to bridge devices that prefetch data from devices on one bus for transfer to devices on another bus.

2. Description of the Related Art

Modem computer systems typically employ buses to convey information between various parts in the computer systems. For example, computer systems generally include one or more buses to connect a central processing unit (CPU) to a main memory and input/output (I/O) devices for transferring data and control signals. Today, one of the most widely used buses is peripheral component interface (PCI) bus.

With the proliferation of I/O devices such as disk drives, tape drives, printers, scanners, audio/video devices, etc., the PCI bus is used to connect an increasing number of I/O devices. To accommodate the addition of more I/O devices, conventional computer systems typically provide one or more secondary PCI buses in addition to a primary PCI bus. For example, FIG. 1 illustrates a schematic block diagram of a conventional computer system 100 that includes a primary host PCI bus 104 and a secondary PCI bus 112. In the computer system 100, the primary PCI bus 104 is coupled to a host bus bridge 108 on the host side and a PCI-to-PCI bridge 106 on the other. A CPU 102 and a main memory I 10 are coupled to the host bus bridge 108. The host bus bridge 108 provides host chipset and functions as a memory controller in accessing the main memory 110. In this configuration, the CPU 102 accesses the main memory 110 through the host bus bridge 108 to read or store information. The primary PCI bus 104 may also be coupled to other devices such as hard disk drives, audio/video devices, etc.

The secondary PCI bus 112 is coupled to the PCI-to-PCI bridge 106, a pair of SCSI adapters, and a local CPU 116. The SCSI adapter 114 is connected to a plurality of SCSI drives 126 and 128 to provide additional storage capacity to the computer system 100. On the other hand, the SCSI adapter 118 is coupled to a SCSI drive 120, a tape drive 122, and a CD drive 124 to enhance capabilities of the computer system 100. Similarly, the local CPU 116 provides additional processing capabilities and may be used, for example, as an I/O controller, audio/video processor, etc.

The PCI-to-PCI bridge 106 is coupled between the primary PCI bus and a secondary PCI bus 112 and functions to facilitate communication between the PCI devices coupled to the primary PCI bus 104 and the secondary PCI bus 112. The PCI devices are often called PCI agents, which include both PCI master and slave devices. The PCI-to-PCI bridge 106 may include an arbiter (not shown) for arbitrating access to the secondary PCI bus 112 among the PCI agents such as PCI devices 114, 116, and 118.

The PCI-to-PCI bridge 106 allows mapping of address space of one bus into the address space of the other bus through the use of internal configuration registers. Conventional PCI bridges are well known and is described, for example, in U.S. Pat. No. 5,918,026, entitled "PCI to PCI Bridge for Transparently Completing Transactions between Agents on Opposite Sides of the Bridge," and in U.S. Pat. No. 5,905,877 entitled "PCI Host Bridge Multi-Priority Fairness Arbiter." In addition, details of PCI specification and bus systems are amply described by Tom Shanley et al. in PCI System Architecture ($3^{rd}$ ed. 1995). The disclosures of these references are incorporated herein by reference.

Conventional PCI-to-PCI bridges may be implemented in a variety of ways. For example, they may be implemented with or without a prefetch buffer for buffering data received from one bus for transfer to another bus. In performing a data transfer, however, a PCI-to-PCI bridge without a prefetch buffer may require substantial arbitration and command overhead. For instance, in response to a read command from a master, the bridge performs "single-cycle" reads on the target bus and then return the data from that cycle to the original master. If the master still wants more data, a new read command is issued on the target bus. This process is repeated until the original master has received all of the data it requires. Thus, for masters that require a significant amount of data, such bridge is generally not desirable since most of the bus bandwidth is wasted on arbitration and command overhead.

On the other hand, PCI bridges having prefetch buffers generally provide an improved performance. These buffers, often called "prefetch buffers," are used to store data fetched from one PCI device over one PCI bus to another PCI device connected to another PCI bus. One approach has implemented the prefetch buffer as a single buffer that is shared for bursts in both bus directions across the bridge. This allows only a single transaction across the bridge to be active at any given time. In another approach, multiple prefetch buffers are provided so that more than one transaction can be active simultaneously. The multiple buffers reduce the number of separate bursts that needs to be performed, thereby improving performance.

By way of example, the SCSI adapter 114 arbitrates for the secondary PCI bus and requests, as a bus master (i.e., initiator), data from the main memory 110 by issuing a read request to the PCI-to-PCI bridge 106. The bridge 106 queues the read request and issues a proxy read request to the host bus bridge 108. In addition, the bridge 106 issues a retry request to the bus master so that the SCSI adapter 114 periodically reissues the read request until it receives the requested data from the bridge 106. The host bus bridge 108 communicates with the main memory 110 to transfer the requested data from the main memory 110 to the bridge 106. The PCI-to-PCI bridge 106 receives the data from the host bus bridge 108 and stores in its prefetch buffer for transfer to the SCSI adapter 114.

Unfortunately, the amount of data that is prefetched on the target bus often does not match the amount of data required by the original master (e.g., SCSI adapter 114). This is because the amount of data to be prefetched is typically programmed in the bridge 106 to a single fixed size for all masters connected to the secondary PCI bus 112. However, the data requirement of one PCI device may be quite different from another PCI device. For example, one PCI master device may need only 32 bits of data per read operation while another master device may need 4 Kbytes of data. Hence, a single, fixed prefetch size may be too small for some masters and too large for others, thereby wasting bus bandwidth in either case.

Given the fixed prefetch size, conventional bridges were generally optimized for either small bursts or large bursts of data transfer. In this scenario, a bridge that was optimized for small bursts might prefetch only a single 32 -bit word for each read. If the master device required a much larger data, the read operation would have to be broken up into many single word read commands on each PCI bus. As can be appreciated, this would be highly inefficient approach compared to completing the data transfer-in a single burst. At the other extreme, a bridge that has been optimized for large bursts may prefetch 128 bytes or more. On a 32-bit PCI bus, a 128 byte prefetch would consume 32 data cycles. For a master that requires only a single word of read data, for example, 31 of these cycles would be wasted.

Furthermore, a PCI bus may currently accommodate up to 10 PCI devices. Since a PCI bridge is treated as a PCI device, this means that up to 9 PCI master devices with differing data transfer requirements may be attached to the PCI bus. As more master devices are attached to the secondary PCI bus 112 with differing data needs, the problem of prefetch data size mismatch with attendant loss in performance is exacerbated.

Thus, what is needed is a PCI bridge and method for transferring data between two PCI buses in sizes that are specific to each of the master devices so as to improve data transfer performance.

SUMMARY OF THE INVENTION

The present invention fills these needs by providing bridge device for transferring data using master-specific prefetch sizes. It should be appreciated that the present invention can be implemented in numerous ways, including as a process, an apparatus, a system, a device, a method, or a computer readable medium. Several inventive embodiments of the present invention are described below.

In one aspect of the invention, the present invention provides a bridge device for transferring data between master and slave devices. The bridge device is coupled between a first bus and a second bus with the master devices being coupled to the first bus and the slave devices being coupled to the second bus. The bridge device includes a set of prefetch control registers, a prefetch buffer, and bridge control circuitry. The set of prefetch control registers is arranged to store prefetch sizes of data to be prefetched for a set of the master devices with one prefetch control register being provided for a master device. The prefetch buffer is arranged to store data for transfer. The bridge control circuitry is coupled to the prefetch control registers and the prefetch buffer for transferring data between a source device and a destination device. The bridge control circuitry is further arranged to receive a first data transfer request from a selected master device for transferring data between the selected master device and a selected slave device. The bridge control circuitry issues a second data transfer request to the selected slave device for transferring the data. The bridge control circuitry receives the requested data from the source device and stores the received data in the prefetch buffer. The bridge control circuitry transfers the stored data from the prefetch buffer to the destination device when the prefetch buffer receives and stores data size that correspond to the prefetch size stored in a prefetch control register associated with the selected master device.

In another aspect of the present invention provides a bridge device for transferring data between first devices and second devices with the bridge being coupled between a first bus and a second bus. The first devices are coupled to the first bus and the second devices are coupled to the second bus. The bridge device includes a set of prefetch control registers, a prefetch buffer, an arbiter, and bridge control circuitry. The set of prefetch control registers is arranged to store prefetch sizes of data to be prefetched for a set of the first devices with one prefetch control register for one first device. The prefetch buffer is arranged to receive and store data from a source device for transfer to a destination device. The arbiter is arranged to receive requests by one or more first devices for access to the first bus and grants a selected first device access to the first bus. The bridge control circuitry is coupled to the prefetch control registers and the prefetch buffer for transferring the data. The bridge control circuitry is also arranged to receive a first data transfer request from the selected first device for transferring data to or from a selected second device such that one device is the source device and the other device is the destination device. The bridge control circuitry issues a second data transfer request to the selected second device for transferring the data, wherein the bridge control circuitry receives the requested data from the source device and stores the received data in the prefetch buffer. The bridge control circuitry transfers the stored data from the prefetch buffer to the destination device when the prefetch buffer contains data matching the prefetch size in a prefetch control register associated with the selected first device.

In yet another aspect of the invention, a method is disclosed for transferring data between first devices and second devices. The first devices are coupled to the first bus and the second devices are coupled to the second bus. The method includes (a) storing prefetch sizes of data to be prefetched for a plurality of first devices in a plurality of prefetch control registers, one prefetch control register for each first device; (b) arbitrating for the first bus by one or more first devices and granting access to a selected first device as a bus master; (c) receiving a first data transfer request from the selected first device for transferring data to or from a selected second device such that one device provides the data as a source device and the other device receives the data as a destination device; (d) issuing a second data transfer request to the selected second device over the second bus; (e) receiving the requested data from the source device and storing the received data in a prefetch buffer; and (f) when the prefetch buffer contains the data of the prefetch size associated with the selected first device, transferring the stored data from the prefetch buffer to the destination device.

Preferably, the first and second buses are PCI buses. In one embodiment, the prefetch control registers store a set of prefetch parameters for different types of read commands. In addition, the buffer may be segmented into a plurality of segments so that data transfer requests from a plurality of master devices may be carried out by assigning a buffer segment to one of the plurality of master devices.

The present invention thus provides prefetch sizes optimized for the master devices on the secondary PCI bus. The master-specific prefetch sizes allow the bridge to prefetch the desired amount of data for each of the master devices. This allows the buses to be utilized more efficiently while enhancing the performance of data transfers between master and target devices. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 6 shows an exemplary prefetch control register having a plurality of fields in accordance with one embodiment of the present invention.

FIG. 7 illustrates an exemplary prefetch buffer arranged in a plurality of segments in accordance with one embodiment of the present invention.

DETAILED DESCRIPTION OF THE PREFERRED EMBODIMENTS

The present invention, bridge device for transferring data using master-specific prefetch sizes, is described. It will be obvious, however, to one skilled in the art, that the present invention may be practiced without some or all of these specific details. In other instances, well known process operations have not been described in detail in order not to unnecessarily obscure the present invention.

Figure 2:
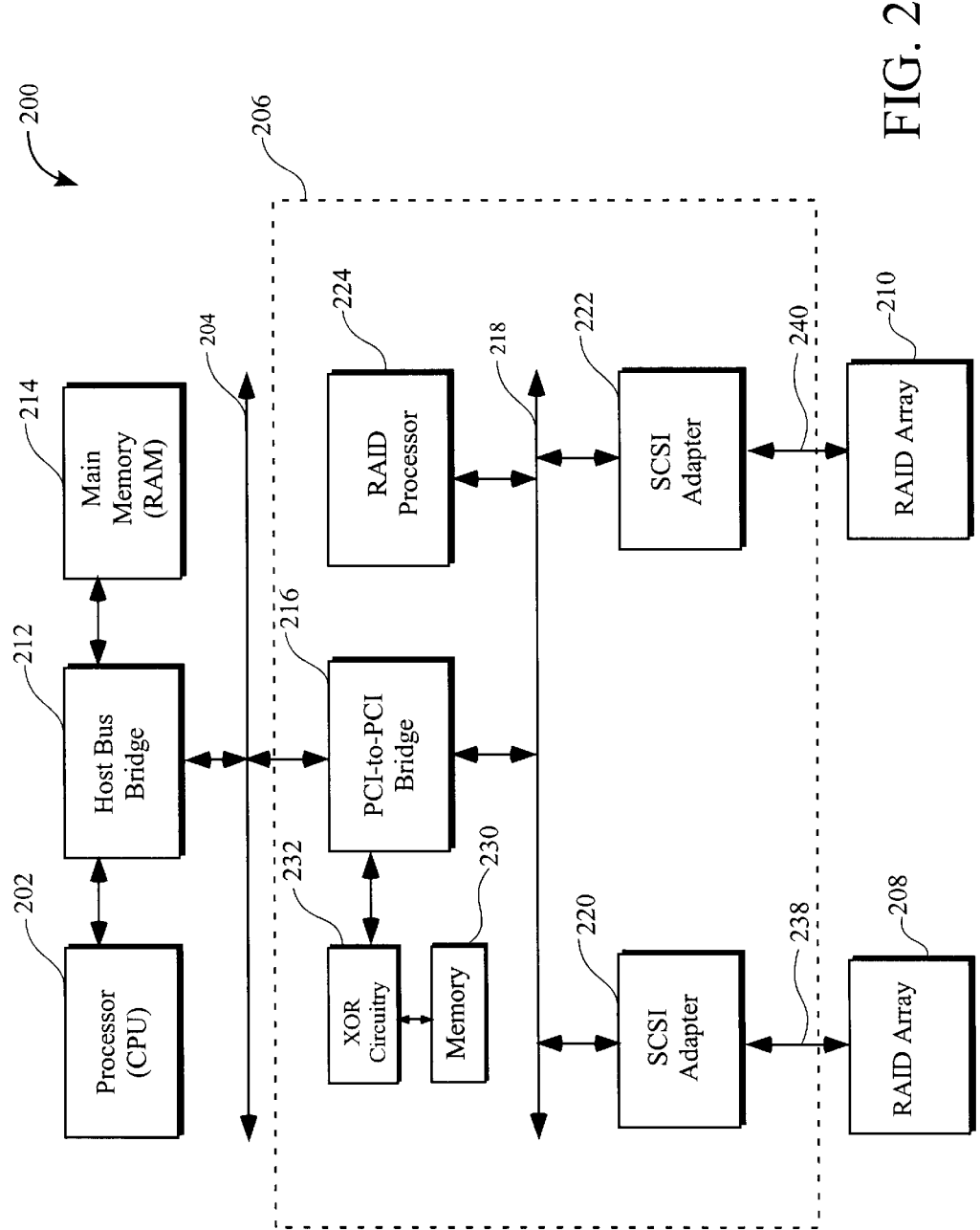
FIG. 2 illustrates a schematic block diagram of an exemplary computer system having a primary PCI bus and a secondary PCI bus in accordance with one embodiment of the present invention.

FIG. 2 illustrates a schematic block diagram of an exemplary computer system 200 having a primary PCI bus 204 and a secondary PCI bus 218 in accordance with one embodiment of the present invention. It should be recognized, however, that the present invention applies to any suitable computer system with a bridge for providing communication between a pair of buses. The computer system 200 includes a processor (CPU) 202, a host bus bridge 212, a main memory 214, a primary PCI bus 204, a redundant array of independent disks (RAID) controller 206, and RAID arrays 208 and 210. The host bus bridge 212 is coupled to the primary PCI bus 204 and provides functions of conventional host chipset circuitry and memory controller for controlling access to the main memory 214.

The memory 214 is coupled to host bus bridge 212 for storing and providing information. The host processor 202 is also coupled to the host bus bridge 212 and processes information such as data and instructions received from the memory 214. Other devices may be coupled to the primary PCI bus such as a hard drive, sound card, graphics controller card, etc. The primary PCI bus 204 serves as a host bus, to which additional peripheral devices can be connected via one or more host adapters. Although the present invention is illustrated using PCI bus, it may employ any suitable buses such as ISA, VESA, AGP, or the like.

The RAID controller 206 is coupled to the primary PCI bus 204 and provides interface and control functions for accessing the RAID arrays 208 and 210 via SCSI bus cables 238 and 240, respectively. In one embodiment, the RAID controller 206 is implemented on an adapter card that can be plugged into the computer system 200. For example, the RAID controller 206 may be mounted on a card that is configured to be plugged into a PCI bus slot provided in the motherboard of the computer system 200.

The RAID arrays 208 and 210 coupled to the RAID controller 206 may be implemented by using a set of SCSI disk drives, which are coupled to the respective SCSI adapters 220 and 222 via SCSI bus cables 238 and 240. RAID arrays are well known and are described, for example, by Paul Massiglia in *The RAID Book, A Storage System Technology Handbook* ($6^{th}$ Ed. 1997), which is incorporated herein by reference.

The RAID controller 206 includes a PCI-to-PCI bridge 216, a RAID processor 224, and a pair of PCI-to-SCSI adapters 220 and 222, each of which is a PCI device (i.e., agent) coupled to the secondary PCI bus 218. The PCI-to-PCI bridge 216 functions to facilitate communication between PCI devices coupled to the primary PCI bus 204 and the secondary PCI bus 218 by mapping of address space of a bus into the address space of the other bus. To implement RAID features, the RAID processor 224 controls RAID data processing by coordinating communication of data among the SCSI adapters 220 and 222 and the PCI-to-PCI bridge 216. The SCSI adapter 220 is coupled to the RAID array 208 via SCSI bus cable 238 while the SCSI adapter 222 is coupled to the RAID array 210 via SCSI bus cable 240. These RAID arrays 208 and 210 provide a high performance fault-tolerant means of storing a large amount of data.

The PCI-to-PCI bridge 216 is coupled to XOR circuitry 232, which is, in turn, coupled to a memory 230. As is well known, the XOR circuitry 232 receives data (e.g., old data, new data, old parity) from the bridge 216 and performs one or more XOR operations using the memory 230 to generate new parity. The new data and the new parity are then stored in one of the RAID arrays 208 and 210 via PCI-to-PCI bridge 216.

The PCI devices (e.g., RAID processor 224, SCSI adapters 220 and 222, and PCI-to-PCI bridge 216) coupled to a PCI bus may function as either a master or slave devices. Although such PCI devices are illustrated herein, the present invention works equally well with any other suitable PCI devices. A master device is one that can arbitrate for access to a bus to communicate with a slave (i.e., target) device. A master that has won arbitration and has been granted access to the bus is called an initiator. The initiator typically starts a transaction by asserting FRAME# and driving the address and command (e.g., request) signals onto the bus. For example, the SCSI adapter 220, as an initiator, may issue a read command to read data from the main memory 214. The bridge 216 receives the request as a slave on the secondary bus side and issues a proxy request as a master to the host bus bridge 212, which fetches the requested data from the memory 214 to the bridge 216.

Figure 1:
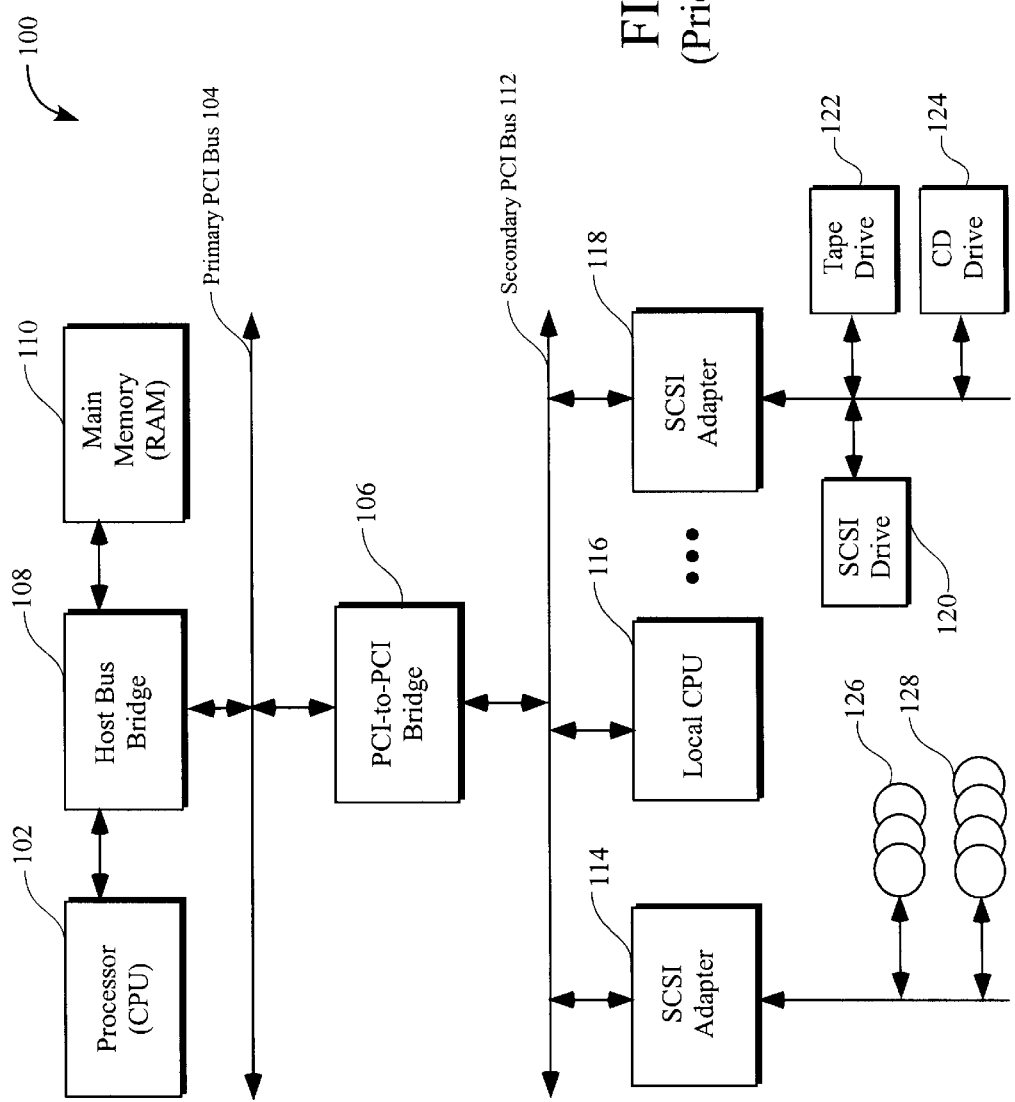
FIG. 1 illustrates a schematic block diagram of a conventional computer system that includes a primary host PCI bus and a secondary PCI bus.
Figure 3:
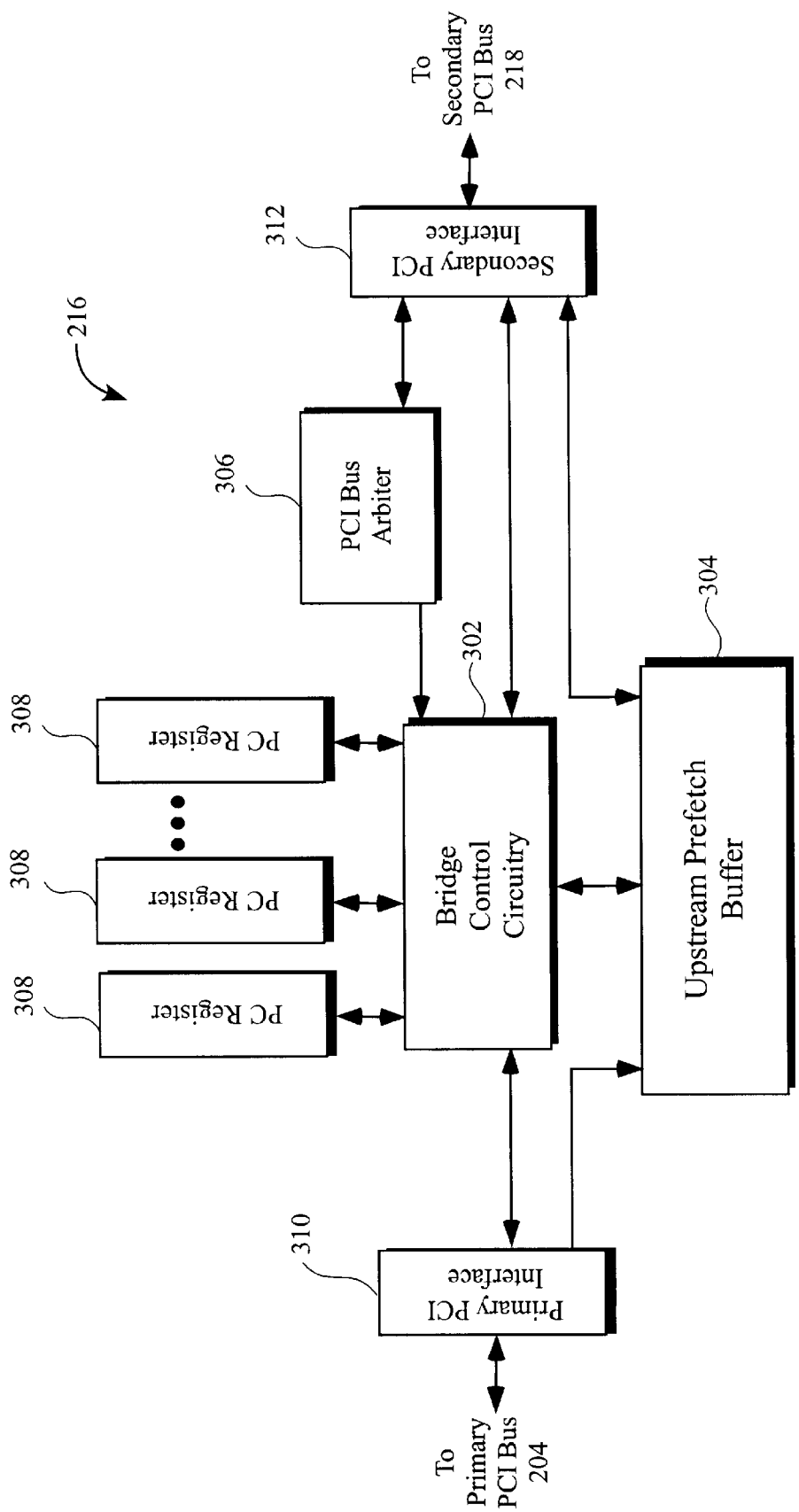
FIG. 3 shows a more detailed block diagram of a PCI-to-PCI bridge in accordance with one embodiment of the present invention.

FIG. 3 shows a more detailed block diagram of the PCI-to-PCI bridge 216 in accordance with one embodiment of the present invention. It should be appreciated, however, that the PCI-to-PCI bridge 216 illustrated herein is equally suitable for use between any two PCI buses. For example, the PCI-to-PCI bridge 106 of FIG. 1 may also be implemented by using the bridge 216. As shown, the PCI-to-PCI bridge 216 includes bridge control circuitry 302, an upstream read/write buffer 304 (i.e., prefetch buffer), a PCI bus arbiter 306, a set of prefetch control registers 308, a primary PCI interface 310, and a secondary PCI interface 312. The interfaces 310 and 312 provide the bridge 216 with interface functions between the primary and secondary PCI buses 204 and 218 for communicating data and control signals. Specifically, the primary PCI interface 310 interfaces with the primary PCI bus 204 on the host side while the secondary PCI interface 312 interface with the secondary PCI bus 218.

For arbitrating access to the secondary PCI bus 218, the PCI arbiter 306 is coupled between the secondary PCI interface 312 and the bridge control circuitry 302. The arbiter 306 receives and evaluates requests for access to the secondary PCI bus from one or more PCI devices (e.g., SCSI adapters 220 and 222, RAID processor 224) attached to the secondary PCI bus 218 and grants the PCI bus to one of the requesting PCI devices as a bus master. In selecting the bus master, the PCI arbiter 306 may implement any well known system-specific arbitration algorithm. Although the PCI arbiter 306 is shown to be included in the PCI-to-PCI bridge 216, it may be provided externally in an alternative embodiment.

Provided between the primary and secondary PCI buses 204 and 218, the bridge control circuitry 302 receives transactions (e.g., requests or commands) on one bus as a slave and determines whether to pass the transaction to the other bus. When it determines that the transaction is to be passed on to the other bus, the bridge control circuitry 302 transmits the transaction onto the other bus as a master. For example, the bridge control circuitry 302 may receive and transmit a request between the PCI buses 204 and 218 via interfaces 310 and 312.

The prefetch control registers 308 are coupled to the bridge control circuitry 302 and stores prefetch sizes of data to be prefetched for the master devices coupled to the secondary PCI bus 218. One prefetch control register is associated with one master. Thus, prefetch sizes that are optimized for associated master can be stored in the prefetch control registers 308 to enhance data transfer performance. Preferably, the prefetch control registers are programmable so that the prefetch size and/or the assigned master can be changed to provide additional flexibility.

The upstream prefetch buffer 304 is coupled between the primary PCI interface 310 and the secondary PCI interface 312. The upstream prefetch buffer 304 is used to store data for a read or write operation initiated by a master device on the secondary PCI bus 218. For example, a master device on the secondary PCI bus 218 transmits a data transfer (e.g., read, write) request to the bridge 216, which issues a proxy request to a slave (i.e., target) device such as the main memory 214 on the primary PCI bus 204. In a read operation, the requested data is fetched from the slave device (i.e., source device) and is stored in the buffer 304 for eventual transfer to the master device (i.e., destination device). For a write operation, on the other hand, the bridge 216 receives data to be written from the master device (i.e., source device) and stores the data in the prefetch buffer 304 for eventual transfer to the slave device (i.e., destination device). As will be shown in greater detail below, the upstream prefetch buffer 304 preferably includes a read buffer and a write buffer.

Figure 4:
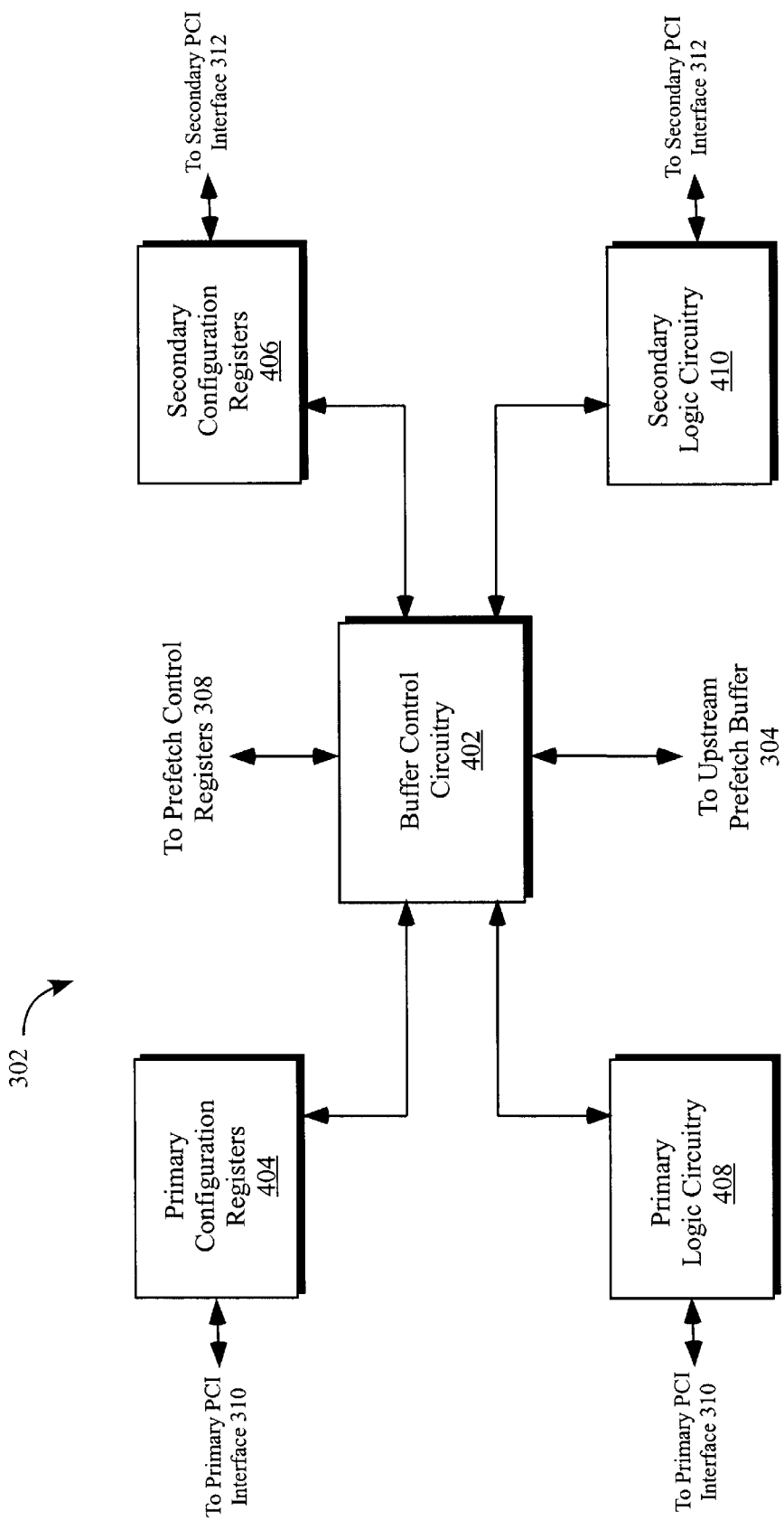
FIG. 4 shows a more detailed block diagram of bridge control circuitry in accordance with one embodiment of the present invention.

FIG. 4 shows a more detailed block diagram of the bridge control circuitry 302 in accordance with one embodiment of the present invention. The bridge control circuitry 302 includes buffer control circuitry 402, primary configuration registers 404, secondary configuration registers 406, primary logic circuitry 408, and secondary logic circuitry 410. The configuration registers 404 and 406 are provided between the bridge buffer circuitry 402 and the PCI bus interfaces 310 and 312, respectively, to allow communication among PCI bus devices on a bus. More specifically, the primary configuration registers 404 are coupled between the primary PCI interface 310 and the buffer control circuitry 402 while the secondary configuration registers 406 are coupled between the secondary PCI interface 312 and the buffer control circuitry 402. These configuration registers 404 and 406 are used to store information required for communication with other PCI devices such as device ID, vendor ID, status, command, class code, revision ID, header type, latency timer, cache line size, and the like in accordance with well known PCI bus specifications. The information provided in the configuration registers 404 or 406 allows a PCI device to communicate with another device on the same bus.

To function as a bridge, the PCI-to-PCI bridge 216 needs to determine whether it is to function as a master or a slave. For this purpose, the primary logic circuitry 408 and secondary logic circuitry 410 are used to determine whether the bridge 216 is to function as a master or a slave. The primary logic circuitry 408 is coupled between the primary PCI interface 310 and the buffer control circuitry 402 while the secondary logic circuitry 410 is coupled between the secondary PCI interface 312 and the buffer control circuitry 402. In this configuration, when a request is received from a master on the secondary PCI bus 218, the secondary logic circuitry 410 determines that the bridge 216 is to function as a slave device. On the other hand, the primary logic circuitry 408 determines that the bridge 216 is to function as a master device on the primary bus 204 when the bridge 216 issues a proxy request for the received request to a target device on the primary PCI bus 204.

The buffer control circuitry 402 is coupled to the prefetch control registers 308 and the prefetch buffer 304 and is configured to control data transfer to and from the prefetch buffer 304. The data stored in the buffer 304 is transferred to the destination device by using the master-specific prefetch size stored in an associated prefetch register. Specifically, when the bridge 216 receives a data transfer request from a master device on the secondary bus 218, the arbiter 306 determines which one of the prefetch control registers 308 is associated with the master device and provides this information to the buffer control circuitry 402. The buffer control circuitry 402 then selects and accesses the associated prefetch control register 308. When the prefetch buffer 304 contains data matching the specified prefetch size for the master device, the buffer control circuitry 402 causes the data to be transferred from the buffer 304 to the destination device. In the preferred embodiment, a transfer to the buffer 304 may begin while another that fills the prefetch buffer is still in progress based on the programmed prefetch size.

Figure 5:
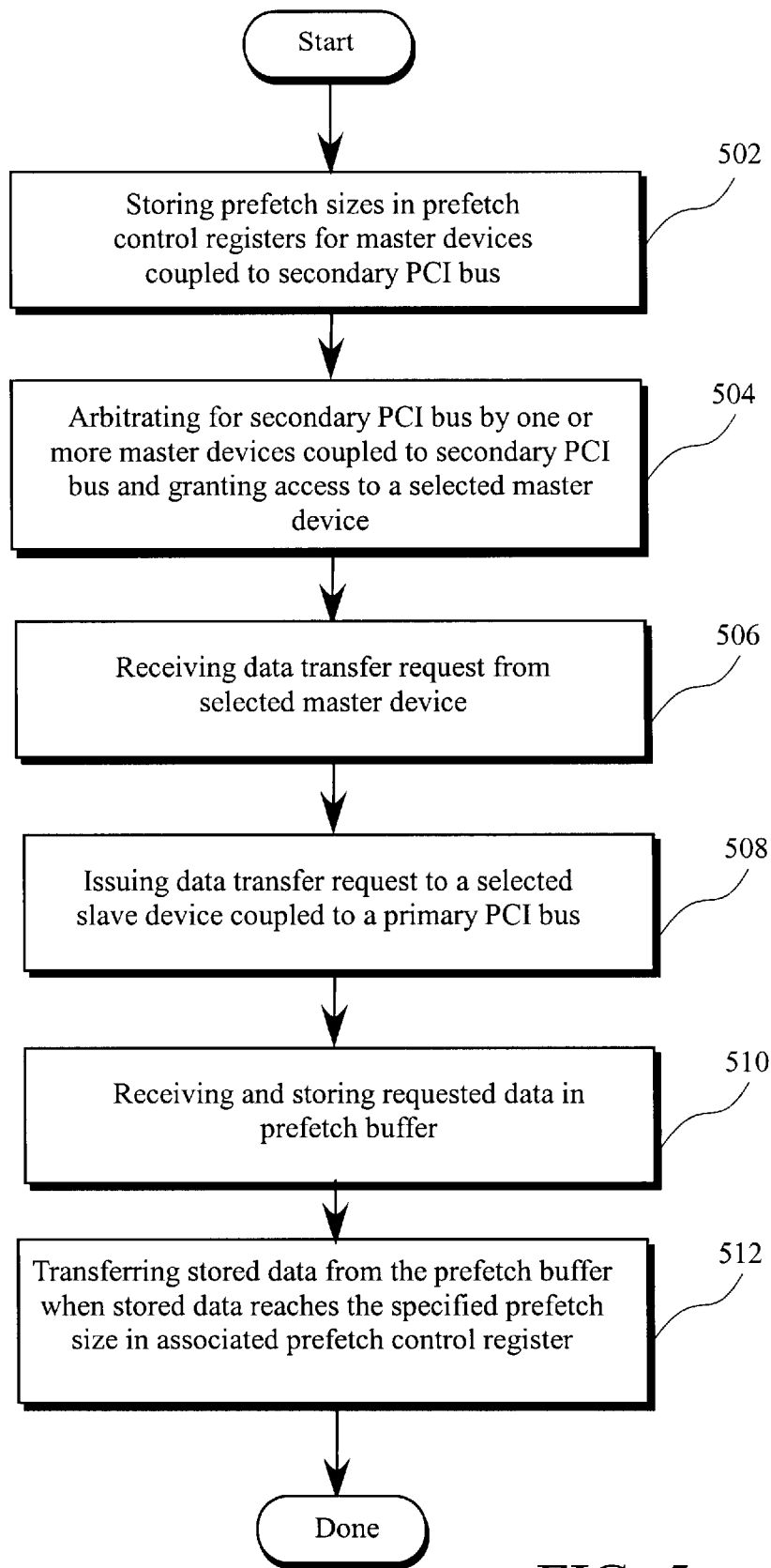
FIG. 5 illustrates a flowchart of an exemplary method performed by the PCI-to-PCI bridge in accordance with one embodiment of the present invention.

FIG. 5 illustrates a flowchart of an exemplary method performed by the PCI-to-PCI bridge 216 in accordance with one embodiment of the present invention. In operation 502, prefetch sizes of data to be prefetched are stored for a plurality of master devices on the secondary PCI bus 218 in a plurality of prefetch control registers. One prefetch control register is preferably provided for each master device. In an alternative embodiment, control registers may be provided for only selected number of master devices that require optimum prefetch size for enhanced performance.

After setting up the prefetch registers, in operation 504, one or more master devices arbitrate for the secondary PCI bus 218 and the arbiter 306 grants a selected master device with exclusive access to the bus 218 as an initiator (i.e., bus master). Then in operation 506, the PCI-to-PCI bridge 216 receives, as a slave device, data transfer request from the master device selected as the initiator for transferring data to or from a selected target (i.e., slave) device. In the data transfer, one device provides the data as a source device and the other device receives the data as a destination device. For example, when the selected master issues a read request to transfer data from a selected slave device, the master functions as a destination device to receive the data while the slave device serves to provide the requested data a source device. On the other hand, when the master issues a write request to transfer data to a selected slave device, the master provides the data as a source device and the slave receives the data as a destination device.

Upon receiving the data transfer request, in operation 508, the PCI-to-PCI bridge 216 issues, as a master device, a proxy data transfer request to the target device on the primary PCI bus 204. In addition, the bridge 216 may, in the case of a read command, issue a retry command to the destination device so that the destination device periodically issues the original request until the data transfer is completed. Then in operation 510, the requested data is received from the source device and stored in the internal prefetch buffer 304. When the prefetch buffer 304 receives data matching the specified prefetch size associated with the selected master device, the data is transferred from the prefetch buffer 304 to the destination device in operation 512. Again, the buffer 304 may be "drained" of its data while a "fill" transfer is in progress. That is, a transfer to the buffer 304 may begin while another that fills the prefetch buffer is still in progress based on the programmed prefetch size.

To enhance performance, each of the prefetch control registers 308 may contain a set of parameters tailored to a variety of situations. FIG. 6 shows an exemplary prefetch control register 308 having a plurality of fields F0, F1, F2, and F3 in accordance with one embodiment of the present invention. In the illustrated embodiment, the prefetch control register 308 is 16 bits wide with each field including 4 bits. The first three fields F0, F1, and F2 are used to store prefetch sizes, which correspond to the amounts of data the bridge 216 prefetches from a source device, for various data transfer commands in accordance with one embodiment.

For example, the field F0 may be used to store a prefetch size for a memory read command, which is a read command that reads less than a cache line from memory. On the other hand, the field F1 may be used to store another prefetch size for a memory read line command for fetching one complete cache line from memory. Similarly, the field F2 may be used to store yet another prefetch size for a memory read multiple command to fetch multiple memory cache lines from memory. It should be noted that these well known commands are exemplary only. As such, prefetch sizes for other commands, read or write, may be specified in any field in the prefetch control register 308 suited to the associated master device.

In addition, the field F3 may be used to store a tap point for the buffer 304. The tap point in field F3 specifies how much data must be in the buffer before the bridge 216 will begin to provide that data to the destination device. The specification of tap point allows the buffer 304, for example, to receive data through the primary bus 204 while, at the same time, transferring data to the secondary PCI bus 218. As can be appreciated, the use of these fields to specify optimized prefetch parameters and/or tap points thus provides substantial flexibility and enhanced performance to suit individual master devices on the secondary bus.

FIG. 7 illustrates a more detailed block diagram of the prefetch buffer 304 arranged in a plurality of segments in accordance with one embodiment of the present invention. The prefetch buffer 304 includes a read prefetch buffer 702 and a write prefetch buffer 704. Each of the read and write prefetch buffers 702 and 704 includes a plurality of segments, each of which is adapted to store data for one master device. For example, the read buffer 702 includes read segments RS0, RS1, RS2, and RS3 while the write buffer 704 includes write segments WS0, WS1, WS2, and WS3. In one embodiment, the size of each segment is 256 bytes.

Since each of these segments are used by one master, up to four read and/or write transactions may be performed at a given time. For example, while one master device is waiting for its data to be transferred to its associated buffer segment, another master, as an initiator, may request data from a target device via the bridge 216. It should be noted that the assignment of these read and write buffer segments to master devices may be programmed to provide additional flexibility.

The present invention thus provides prefetch sizes optimized for the master devices on the secondary PCI bus. The master-specific prefetch sizes allow the bridge to prefetch the desired amount of data for each of the master devices. Further, by providing buffer segments for the master devices, multiple data transfers may be performed simultaneously. Accordingly, the buses are utilized more efficiently and the performance of data transfers between master and target devices is enhanced.

Thus, the present invention, bridge device for transferring data using master-specific prefetch sizes, is disclosed. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A bridge device for transferring data between master and slave devices, said bridge device being coupled between a first bus and a second bus, said master devices being coupled to said first bus and said slave devices being coupled to said second bus, said bridge device comprising:

a set of prefetch control registers for storing prefetch sizes of data to be prefetched for a set of said master devices, one prefetch control register per master device;

a prefetch buffer for storing data; and bridge control circuitry coupled to said prefetch control registers and said prefetch buffer for transferring data between a source device and a destination device, said bridge control circuitry being arranged to receive a first data transfer request from a selected master device for transferring data between said selected master device and a selected slave device, said bridge control circuitry issuing a second data transfer request to said selected slave device for transferring said data, wherein said bridge control circuitry receives said requested data from said source device and stores said received data in said prefetch buffer, and wherein said bridge control circuitry transfers said stored data from said prefetch buffer to said destination device when said prefetch buffer receives and stores data size that correspond to said prefetch size stored in a prefetch control register associated with said selected master device.

2. The bridge device as recited in claim 1, wherein each of said prefetch control registers is arranged to store a set of prefetch size parameters including a first prefetch size for when said first data transfer request is a memory read command, a second prefetch size for when said first data transfer request is a memory read line command, and a third prefetch size for when said first data transfer request is a memory read multiple command.

3. The bridge device as recited in claim 1, wherein each of said prefetch control register is arranged to store a tap point defining a data size in said prefetch buffer where said bridge control circuitry begins transferring said data to said destination device.

4. The bridge device as recited in claim 1, wherein said prefetch buffer comprises a read buffer and a write buffer.

5. The bridge device as recited in claim 1, wherein said selected slave device is a main memory.

6. The bridge device as recited in claim 1, wherein said bridge device is provided in a host adapter coupled to a host computer system.

7. The bridge device as recited in claim 1, wherein said first bus is a secondary PCI bus and said second bus is a primary PCI bus in a computer system.

8. The bridge device as recited in claim 1, wherein said prefetch control registers are programmable so as to provide desirable prefetch sizes for said master devices.

9. The bridge device as recited in claim 4, wherein each of said read and write buffers includes a plurality of segments, each of which is adapted to store data for one master device.

10. The bridge device as recited in claim 4, wherein said data transfer request is a read request from said selected master device to said selected slave device so that said source device is said selected slave device and said destination device is said selected master device, wherein said data is stored in said read buffer for transfer to said destination device.

11. The bridge device as recited in claim 4, wherein said data transfer request is a write request from said selected master device to said selected slave device so that said source device is said selected master device and said destination device is said selected slave device, wherein said data is stored in said write buffer for transfer to said destination device.

12. A bridge device for transferring data between first devices and second devices, said bridge being coupled between a first bus and a second bus, said first devices being coupled to said first bus and said second devices being coupled to said second bus, said bridge device comprising:
a set of prefetch control registers for storing prefetch sizes of data to be prefetched for a set of said first devices, one prefetch control register per first device;
a prefetch buffer for receiving and storing data from a source device for transfer to a destination device;
an arbiter arranged to receive requests by one or more said first devices for access to said first bus, wherein said arbiter grants a selected first device access to said first bus; and
bridge control circuitry coupled to said prefetch control registers and said prefetch buffer for transferring said data, said bridge control circuitry being arranged to receive a first data transfer request from said selected first device for transferring data to or from a selected second device such that one device is the source device and the other device is the destination device, said bridge control circuitry issuing a second data transfer request to said selected second device for transferring said data, wherein said bridge control circuitry receives said requested data from said source device and stores said received data in said prefetch buffer, and wherein said bridge control circuitry transfers said stored data from said prefetch buffer to said destination device when said prefetch buffer contains data matching the prefetch size in a prefetch control register associated with said selected first device.

13. The bridge device as recited in claim 12, wherein each of said prefetch control registers is arranged to store a set of prefetch size parameters including a first prefetch size for when said first data transfer request is a memory read command, a second prefetch size for when said first data transfer request is a memory read line command, and a third prefetch size for when said first data transfer request is a memory read multiple command, wherein said requested data is transferred in units of said associated prefetch size.

14. The bridge device as recited in claim 12, wherein said prefetch buffer comprises a read buffer and a write buffer.

15. The bridge device as recited in claim 12, wherein said selected second device is a main memory.

16. The bridge device as recited in claim 12, wherein said first and second buses are PCI buses.

17. The bridge device as recited in claim 12, wherein said prefetch control registers are programmable so as to provide desirable prefetch sizes for said first devices.

18. The bridge device as recited in claim 13, wherein each of said prefetch control register is further arranged to store a tap point defining a data size in said prefetch buffer where said bridge control circuitry begins transferring said data to said destination device.

19. The bridge device as recited in claim 14, wherein each of said read and write buffers includes a plurality of segments, each of which is adapted to store data for one first device.

20. The bridge device as recited in claim 14, wherein said data transfer request is a read request from said selected first device to said selected second device so that said source device is said selected second device and said destination device is said selected first device, wherein said data is stored in said read buffer for transfer to said destination device.

21. The bridge device as recited in claim 14, wherein said data transfer request is a write request from said selected first device to said selected second device so that said source device is said selected first device and said destination device is said selected second device, wherein said data is stored in said write buffer for transfer to said destination device.

22. In a computer system, a method for transferring data between first devices and second devices, said first devices being coupled to said first bus and said second devices being coupled to said second bus, said method comprising:
storing prefetch sizes of data to be prefetched for a plurality of first devices in a plurality of prefetch control registers, one prefetch control register for each first device;
arbitrating for said first bus by one or more first devices and granting access to a selected first device as a bus master;
receiving a first data transfer request from said selected first device for transferring data to or from a selected second device such that one device provides said data as a source device and the other device receives said data as a destination device;
issuing a second data transfer request to said selected second device over said second bus;
receiving said requested data from said source device and storing said received data in a prefetch buffer; and
when said prefetch buffer contains said data of said prefetch size associated with said selected first device, transferring said stored data from said prefetch buffer to said destination device.

23. The method as recited in claim 22, further comprising:
issuing a retry command to said destination device such that said destination device issues said data transfer command periodically until said data transfer is completed.

24. The bridge device as recited in claim 22, wherein each of said prefetch control registers is arranged to store a set of prefetch size parameters including a first prefetch size for when said first data transfer request is a memory read command, a second prefetch size for when said first data transfer request is a memory read line command, a third prefetch size for when said first data transfer request is a memory read multiple command, wherein said requested data is transferred in units of said associated prefetch size.

25. The bridge device as recited in claim 23, wherein said selected second device is a main memory.

26. The bridge device as recited in claim 23, wherein said prefetch buffer comprises a read buffer and a write buffer.

27. The bridge device as recited in claim 23, wherein said first and second buses are PCI buses.

28. The bridge device as recited in claim 23, wherein said prefetch control registers are programmable so as to provide desirable prefetch sizes for said first devices.

29. The bridge device as recited in claim 24, wherein each of said prefetch control register is arranged to store a tap point defining a data size in said prefetch buffer at which point said data begins to be transferred to said destination device.

30. The bridge device as recited in claim 26, wherein each of said read and write buffers includes a plurality of segments, each of which is adapted to store data for one first device.

31. The bridge device as recited in claim 26, wherein said data transfer request is a read request from said selected first device to said selected second device so that said source device is said selected second device and said destination device is said selected first device, wherein said data is stored in said read buffer for transfer to said destination device.

32. The bridge device as recited in claim 26, wherein said data transfer request is a write request from said selected first device to said selected second device so that said source device is said selected first device and said destination device is said selected second device, wherein said data is stored in said write buffer for transfer to said destination device.

* * * * *